United States Patent

Lu

[11] Patent Number: 5,986,822
[45] Date of Patent: Nov. 16, 1999

[54] REARVIEW MIRROR FOR MOTOR VEHICLE, ESPECIALLY CAR OR BUS

[76] Inventor: Pengshou Lu, Room 2-401, Building 22, Jiefang 14, Tianjinlu, Luoyang City, Henan 471039, China

[21] Appl. No.: 08/898,666

[22] Filed: Jul. 22, 1997

[30] Foreign Application Priority Data

Jul. 23, 1996 [CN] China ................................. 96109115

[51] Int. Cl.[6] .............................. G02B 17/00; G02B 5/04; G02B 5/08; G02B 7/00
[52] U.S. Cl. .......................... 359/726; 359/834; 359/857; 359/861; 359/503
[58] Field of Search ..................................... 359/402, 503, 359/504, 726, 737, 831, 833, 834, 850, 857, 861

[56] References Cited

U.S. PATENT DOCUMENTS

| | | | |
|---|---|---|---|
| 1,644,902 | 10/1927 | Voigt | 359/861 |
| 1,905,323 | 4/1933 | Wallace . | |
| 1,907,800 | 5/1933 | Harrington | 359/837 |
| 2,570,357 | 10/1951 | Martin | 359/861 |
| 2,622,482 | 12/1952 | Balkin . | |
| 3,619,040 | 11/1971 | Rickets | 359/834 |
| 3,809,462 | 5/1974 | Baumgardner et al. | 359/861 |
| 3,826,562 | 7/1974 | Baumgardner et al. | 359/861 |
| 4,469,405 | 9/1984 | Chin-Wum | 359/861 |
| 5,559,640 | 9/1996 | Vachss et al. | 359/861 |

FOREIGN PATENT DOCUMENTS

| | | | |
|---|---|---|---|
| 2241085 | 3/1975 | France | 359/402 |
| 0535474 | 5/1958 | Italy | 359/402 |

*Primary Examiner*—Ricky D. Shafer
*Attorney, Agent, or Firm*—Pearne, Gordon, McCoy & Granger LLP

[57] ABSTRACT

A rearview mirror for motor vehicle comprises an optical system and a reflect mirror which are properly intalled in the vehicle. The scene behind the vehicle can be imaged by the optical system and projected to the reflect mirror so that driver can see the back scene and the relative position between the vehicle and other objects behind. The optical system comprises convex lenses, or concave lenses and prisms.

8 Claims, 4 Drawing Sheets

REARVIEW MIRROR FOR MOTOR VEHICLE, ESPECIALLY CAR OR BUS

BACKGROUND OF THE INVENTION

The present invention relates to a rearview mirror for a motor vehicle, especially a car or bus.

Generally, a driver observes the back scene by means of two reflect mirrors on the left and right sides of the vehicle and one inside the vehicle. Therefore, the scene right behind the vehicle can not be seen, and the relative position between the vehicle and the objects behind it can not be seen accurately. Also, it is rather complicated for the driver to observe three mirrors. Now, a rearview mirror using monitor system is known, but it is very complex and costly.

The purpose of this invention is to provide a new rearview mirror of pure optical system, which is properly fixed in a car or bus, for example, near its rear window, so that the driver can see the back scene right behind the vehicle and the relative positions between the vehicle and other objects behind.

BRIEF SUMMARY OF THE INVENTION

For this purpose, the present invention provides two optical systems which perform the same function but are slightly different in features, so as to be applied to different vehicles. The two systems are pure optical systems using optical elements such as lens or prism, without any electrical or electronic elements and power source. To see the rear sight, the driver can simply look toward the front.

BRIEF DESCRIPTION OF THE SEVERAL VIEWS OF THE DRAWINGS

Now the present invention is described hereafter with reference to the drawings, wherein.

DETAILED DESCRIPTION OF PREFERRED EMBODIMENTS

Figure 1:
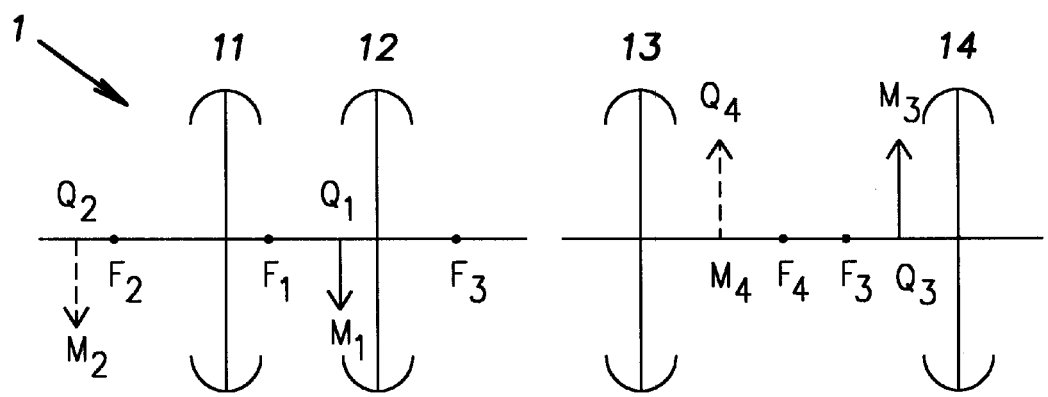
FIG. 1 is a schematic view of the first optical system of this invention.

The first optical system 1 shown in FIG. 1 comprises a first biconvex lens 11 which is positioned, when used for a car in the central position of an upper edge of the rear window of the car, and gets a large range of back scene including the rear edge and left and right corners of the trunk into an inverted image $M_1Q_1$ with severe negative distortion; then a second biconvex lens 12 is arranged in a way that the image formed by the first lens is within its focus $F_2$, so as to get an inverted virtual image $M_2Q_2$ with some positive distortion which partially offsets the negative distortion brought by the first lens, the image obtained here is still an upside down image with severe negative distortion; so a third biconvex lens 13 is arranged to put the inverted virtual image of the second lens beyond its focus $F_3$ in order to get an upright image $M_3Q_3$ but with more severe negative distortion; therefore a fourth biconvex lens 14 is arranged to put the upright image formed by the third lens within its focus $F_4$, so as to produce enough positive distortion to offset the negative distortion of the third lens and to get a fine image of the back scene.

Figure 2A:
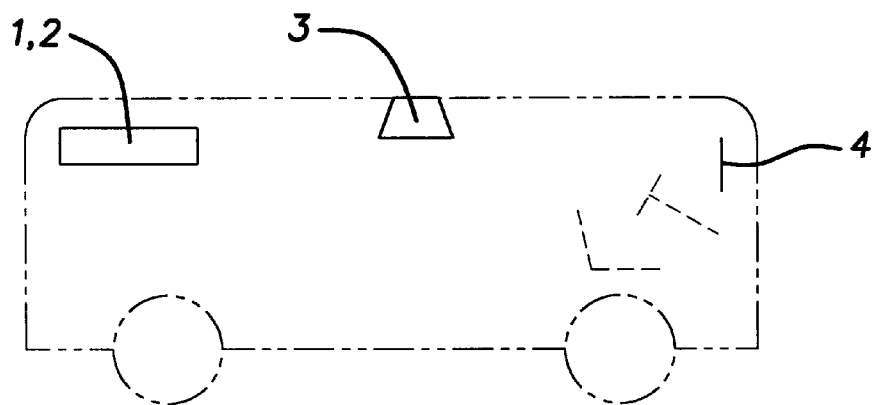
FIG. 2 is a schematic view of the rearview mirror according to this invention used in a bus.
Figure 2B:
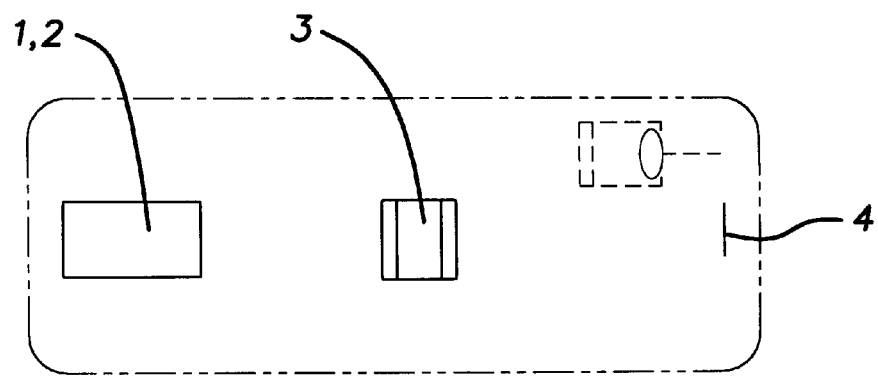

This optical system can make full use of the entire areas of the lenses and reduce the external dimention of the whole optical device, this is especially significant when using in vehicles having strictly limited internal space. The external dimention of this optical system is larger than that of the second optical system, so it is more suitable for bus who has longer body. Its first lens can be placed in a position closely adjacent to the upper central area of the rear window. If the condition permits, the image obtained from the fourth lens can be directly projected to the existing reflect mirror 4 in front of the driver. If the height difference between the optical system and the reflect mirror is to much, an appropriate intermediate prism 3 can be arranged between them to refract the image into the mirror 4, as shown in FIG. 2.

Figure 3:
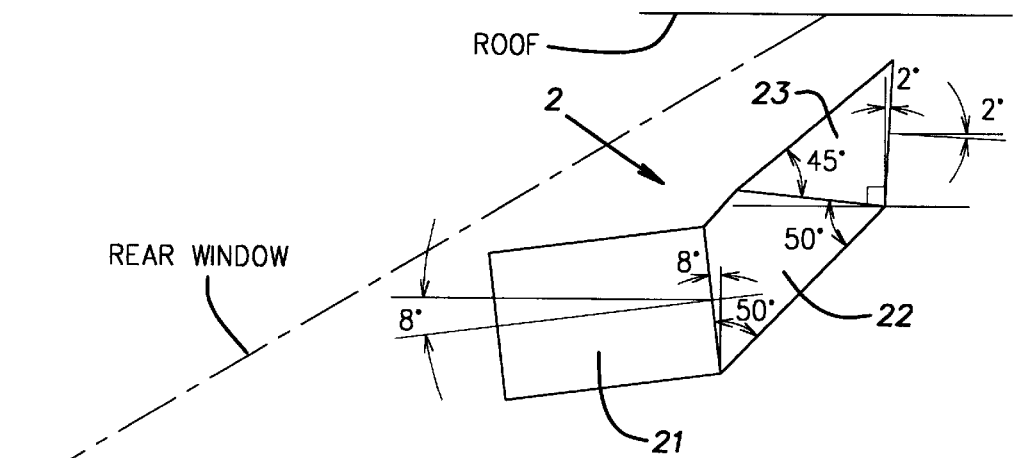
FIG. 3 is a schematic view of the second optical system of the present invention.
Figure 5A:
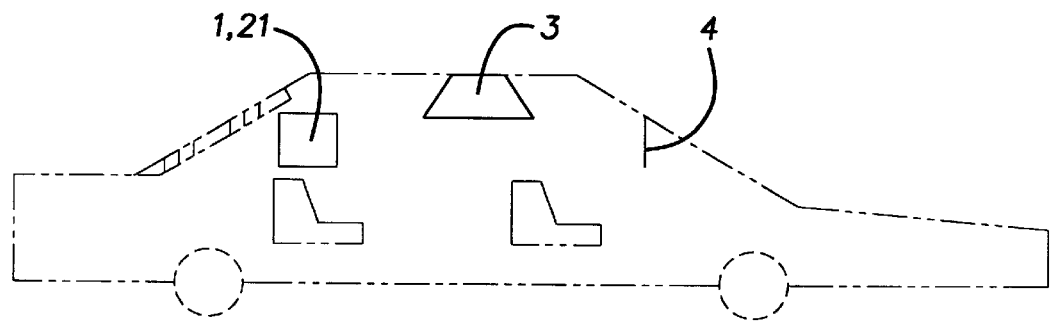
FIG. 5 shows another embodiment of the rearview mirror for car according to the present invention.
Figure 5B:
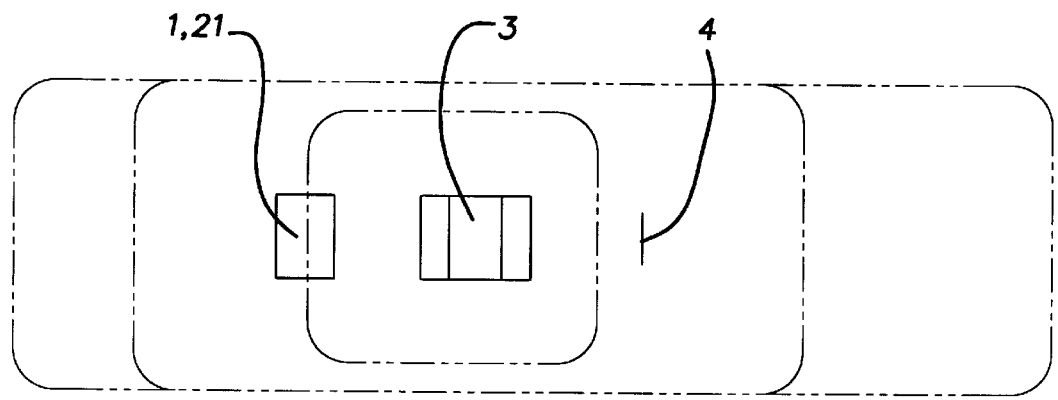

FIG. 3 shows the second optical system 2. Compared to the first optical system, the second one uses less lenses, therefore has less loss of light, it forms a brighter image under the same outside condition of light and costs less. Its first lens 21 is a biconcave lens for picking up the scene, and the second and third optical elements 22 and 23 are prisms for changing the optical axis direction. When the condition allows and the optical axis direction is unnecessary to be changed, the two prisms may be removed or replaced by an isosceles prism 3 arranged on the roof of the car, as shown in FIG. 5.

Figure 4A:
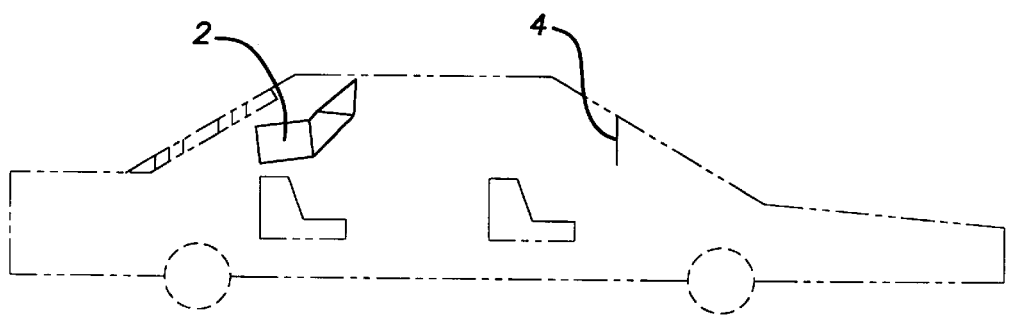
FIG. 4 is a schematic view of the optical system shown in FIG. 3 used in a car.
Figure 4B:
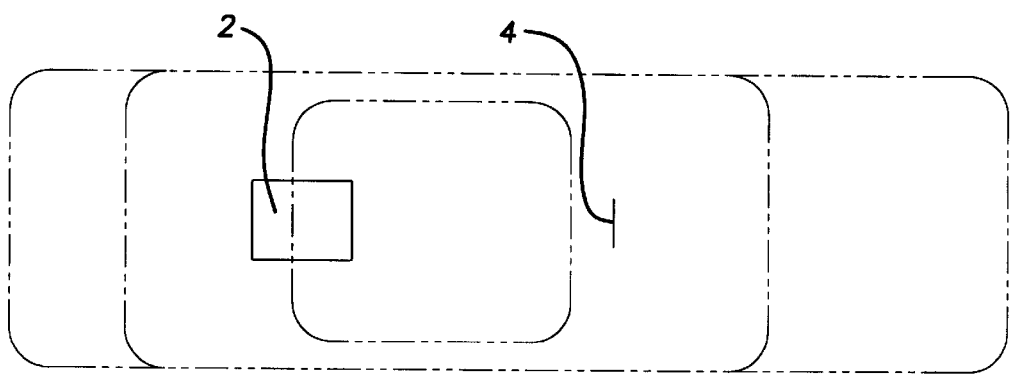

This system can be applied to existing cars. As shown in FIG. 4, it is mounted in the middle of the upper portion of the car's rear window. Its first lens takes a large range of rear view including the edge and left and right corners of the car trunk, so as to get an upright virtual image which is then projected to mirror 4 in front of the driver through an isosceles prism 22 of the second optical element and an right-angle prism 23 of the third optical element, as shown in FIG. 4.

Figure 6A:
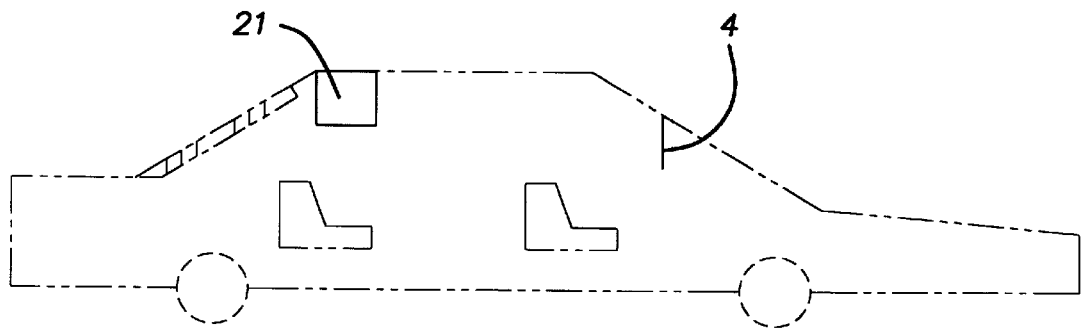
FIG. 6 shows again another embodiment of the rearview mirror for car according to the present invention.
Figure 6B:
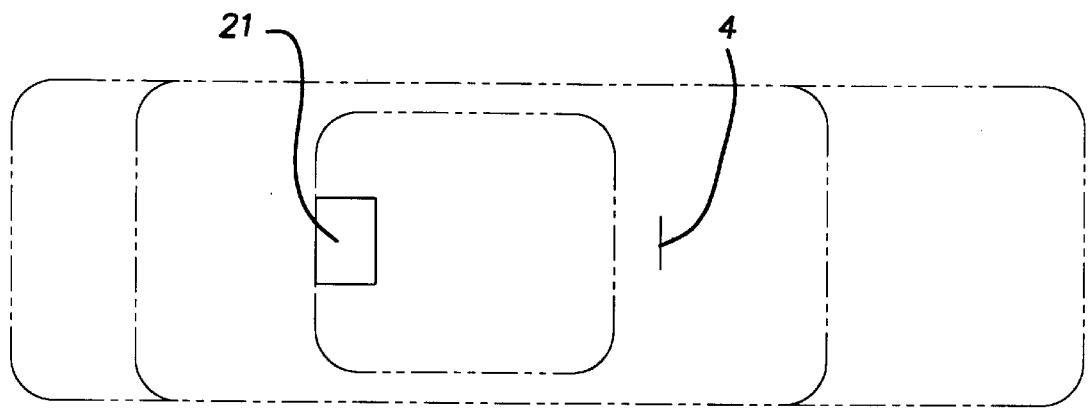

The system can also be applied more ideally in a newly designed and manufactured vehicle. In this case, the mounting position of the system can be better arranged. A window can be opened above the rear window near the corner of the roof and a biconcave lens 21 can be installed there, as shown in FIG. 6, with its optical axis inclined downward to an angle, for example about 10 degrees, for taking the view behind. According to the interior conditions of the compartment, the image formed by the lens can be either directly projected or rafracted through a properly arranged intermediate prism 3 (shown in FIG. 5) into the reflect mirror 4 in front of the driver.

Another application of the system relates to midde and large size vehicles, such as shown in FIG. 2.

Figure 7A:
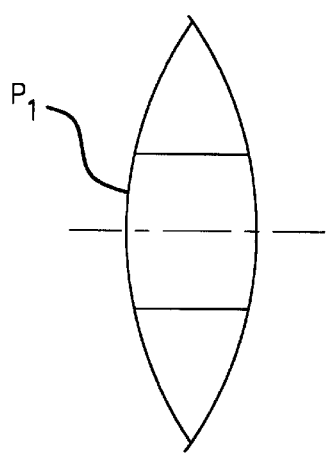
FIG. 7 is a schematic view of the bar-shaped portion of the convex lens according to the present invention.
Figure 7B:
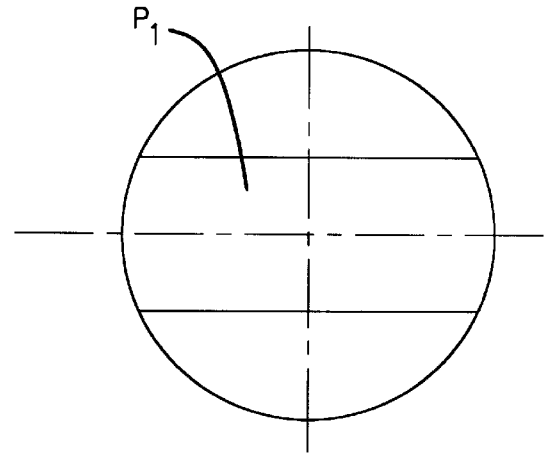
Figure 8A:
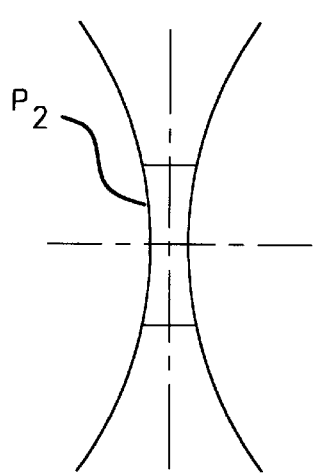
FIG. 8 is a schematic view of the bar-shaped portion of the concave lens according to the present invention.
Figure 8B:
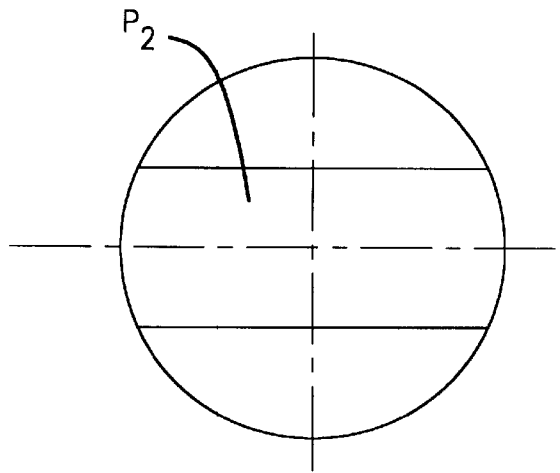

Considering the narrow space inside the vehicle, the lens of said two kinds of optical systems may be only a bar-shaped portion $P_1$, $P_2$ of a circular convex or concave lens, which is shaped by cutting off the properly sized upper and lower portions with respect to the optical axis of a circular lens, as shown in FIG. 7 and 8. This will not affect the quality of image and range of observation.

The lenses are made of optical glass, special optical glass or plastic optical glass, preferably special optical glass with high refraction index.

The optical elements which form the rearview system can be assembled in cases made of metal, plastics or compound materials. The inside walls of the cases are painted in white to avoid the loss of light. Glass plates can be provided respectively at the light-in and light-out openings of the cases to protect the lenses.

The rearview mirror according to the present invention has the following advantages.

- through the existing reflect mirror, the driver can get a large range of back scene and the relative positions of his vehicle with other objects behind, this reduces the inconvenience and time for observation and reduces the labor intensity, thus the driver can drive more conveniently and safely;
- the principle and the structure of the optical systems are simple, there is no need of complex systems for shooting, transmitting and displaying;
- resistant to the vibration during running;
- the optical system is durable without the needs of daily maintenance;
- the system is installed inside the vehicle and can work under any weather conditions by setting up a heating element and a windshield wiper on the corresponding part of the window near which the system is mounted;
- the cost is much more lower than that of a rearview mirror with photoelectric system.

Because of the advantages listed above, the present invention can be applied to various vehicles and will bring great economic and social results.

An embodiment of the second optical system of the present invention for cars will now be described.

Said optical system is shown in FIG. 3. Its first optical element is two biconcave lenses 21 with viewing angle of 82 degrees, diameter of 250 mm, being in a bar shape with the dimention of 40 mm (or less) respectively above and below its optical axis, the focus of lens is 290 mm, the calcutaled curvature radius is 360 mm (approximate value according to national standard), the refraction index of material is 1.62. The second optical element is an isosceles prism 22 of 50 degrees, the third element is a right-angle prism 23. The system is installed in the middle under the upper edge of the rear window, as shown in FIG. 4. The optical axis may be inclined downward at an appropriate angle β with respect to horizontal plane, the value of β here can take about 8 degrees, so that a large range of the scene behind the car as well as the edge and left and right corners of the trunk can be seen simultaneously. If the view in the reflect mirror is too small, the size of the mirror or lens might be enlarged, and the height dimention of the mirror or lens can be reduced if it is too large, all depends on the type of the vehicle.

When applied to newly designed or manufactured cars, the rearview optical system can be arranged more coordinately and appropriately. As mentioned above, the two prisms 22, 23 can be removed, and the biconcave lens 21 can be fixed on the roof at the highest position close to the corner of the rear window, as shown in FIG. 6. Though there exists a slight height difference between the optical system and the reflect mirror in front of the driver, generally, no refracting prism is required. For some cars, as shown in FIG. 5, a prism 3 may be needed to be mounted on the roof. For large buses, a prism can be generally placed on the roof as shown in FIG. 2.

I claim:

1. A rearview mirror for viewing a desired scene behind a motor vehicle, said rearview mirror comprising an optical system (1, 2) at a back of said vehicle and a reflect mirror (4) at a front of said vehicle for a driver of the vehicle to observe the scene therein, said optical system including at least one lens and each lens of said optical system being a biconcave lens, and further including an isosceles prism (22) and a right-angle prism (23) for changing the direction of an optical axis of said optical system, said optical system projecting an image of the scene behind the vehicle to said reflect mirror.

2. A rearview mirror according to claim 1, wherein said optical system (1, 2) is installed at an appropriate position of the upper part of a rear window or a roof of the vehicle.

3. A rearview mirror according to claim 1, wherein said lens is bar-shaped and formed by cutting off properly sized upper and lower portions with respect to the optical axis of a circular lens.

4. A rearview mirror according to claim 1, wherein said biconcave lens is made of optical materials with high refraction index so as to capture a wide range of the desired scene with a relatively small biconcave lens.

5. A rearview mirror according to claim 1, wherein no optical components are located between said optical system and said reflect mirror.

6. A rearview mirror according to claim 1, wherein no additional reflect mirror is located between said biconcave lens of said optical system and said reflect mirror.

7. A rearview mirror according to claim 1, wherein the image is viewed directly in the reflect mirror by the driver of the vehicle.

8. A rearview mirror according to claim 1, wherein said optical system includes only one biconcave lens.

* * * * *